US005204648A

United States Patent [19]

Jei

[11] Patent Number: 5,204,648

[45] Date of Patent: Apr. 20, 1993

[54] DEFLECTION YOKE

[75] Inventor: Kangryong Jei, Kyunggi, Rep. of Korea

[73] Assignee: Samsung Electron Devices Co., Ltd., Kyunggi, Rep. of Korea

[21] Appl. No.: 715,919

[22] Filed: Jun. 14, 1991

[30] Foreign Application Priority Data

Oct. 24, 1990 [KR] Rep. of Korea .................... 90-16290

[51] Int. Cl.[5] ........................ H04N 5/655; H01F 7/00; H01H 1/00; H01H 5/00

[52] U.S. Cl. .................................... 335/210; 335/212; 335/213; 358/249

[58] Field of Search ................................ 335/210–214; 313/440; 358/248, 249

[56] References Cited

U.S. PATENT DOCUMENTS

| | | | |
|---|---|---|---|
| 3,500,270 | 3/1970 | Anthony | 335/210 |
| 3,761,848 | 9/1973 | Sugiura | 335/210 |
| 3,939,447 | 2/1976 | D'Amato | 335/210 |
| 4,353,094 | 10/1982 | Dam | 335/210 |

FOREIGN PATENT DOCUMENTS

| | | |
|---|---|---|
| 61-7703 | 3/1986 | Japan . |
| 62-7658 | 2/1987 | Japan . |

*Primary Examiner*—Leo P. Picard
*Assistant Examiner*—Raymond Barrera
*Attorney, Agent, or Firm*—Christie, Parker & Hale

[57] ABSTRACT

A deflection yoke for a color cathode ray tube has a cone part and a neck holder part. The neck holder part is attached on the outer circumferential surface of the neck of the CRT. The cone part can be rotated against the neck holder part and the neck holder part can be disconnected from the cone part. In the neck holder part, elastic bridges are equally arranged on the outer circumferential surface of a tubular plug. A plurality of ratchets are projected on the elastic bridges. Furthermore, teeth are equally arranged on the inner circumferential surface of the opening of the cone part. The teeth receive the tubular plug in order to mesh with the plurality of ratchets.

5 Claims, 4 Drawing Sheets

DEFLECTION YOKE

FILED OF THE INVENTION

The present invention relates to a deflection yoke which is mounted on the outer circumferential surface of the funnel of a color cathode ray tube, and more particularly to a deflection yoke which is enabled to freely adjust a vertical and horizontal deflection coil circumferentially around the neck of a color cathode ray tube after assembling a deflection yoke.

BACKGROUND OF THE INVENTION

A deflection yoke is installed on the rear of the outer circumferential surface of the funnel of a color cathode ray tube. Electric field occurring to a vertical and horizontal deflection coil composing the deflection yoke moves and scans electron beams on a fluorescent screen of the colour cathode ray tube to form the picture. Accordingly, it is found to be important that picture quality depends on the precise position of the deflection yoke on the outer circumferential surface of the funnel of the color cathode ray tube. This precise position is determined by the yoke pull-back and the beam rotation. The yoke pull-back is to move the deflection yoke axially on the outer circumferential surface of the neck of a color cathode ray tube, resulting in controlling the static convergence and the purity. The beam rotation is to adjust the inclination of the deflection yoke mounted on the funnel and move it circumferentially around the outer circumferential surface of the neck, resulting in controlling the dynamic convergence.

FIG. 4 shows the conventional art which was to install a deflection yoke on the funnel of a color cathode ray tube. The deflection yoke was composed by separators. A separator S was provided with a vertical deflection coil V and a horizontal deflection coil H. The vertical deflection coil V was disposed on the outer circumferential surface, and the horizontal deflection coil H was disposed on the inner circumferential surface perpendicularly to this vertical deflection coil. This separator S was inserted on the neck N of the cathode ray tube C and thus secured by a clamp R. Conventionally, the deflection yoke involved the following process. Before clamping, the yoke pull-back was done and concurrently, the deflection yoke was slowly rotated around the outer circumferential surface of the neck, resulting in controlling most appropriately the beam rotation. Then, the clamp R secures it on the neck portion. After clamping, wedges W lay between the funnel of the cathode ray tube C and the deflection yoke, resulting in correcting the inclination of the deflection yoke. However, since the yoke pull-back and the beam rotation were done without other tools, while the yoke pull-back was being, the beam rotation may go awry or while the beam rotation was being, the yoke pull-back may go awry. Furthermore, once the deflection yoke was permanently attached on the cathode ray tube C by adhesive and wedge, if a poor quality product occurring due to improperly installing the deflection yoke is discovered, the adhesive (silicon bond) and wedge should be inconveniently melted again in order to correct the installation of the deflection yoke.

It has been known that the method for solving these problems occurring in the assembly of a deflection yoke was introduced on the Japanese Patent Publication No. Sho 61-7703 of Mar. 8, 1986. The deflection yoke proposed therefrom comprised a cone part and a neck holder part. The cone part comprised a vertical deflection coil and a horizontal deflection coil. The neck holder part was connected to the outer circumferential surface of the neck by a clamp. However, even though the clamp tightened the neck holder up the neck of a CRT, the cone part could freely solely rotate on the outer circumferential surface of the funnel of the cathode ray tube. This structure was very convenient by reason that the yoke pull-back was done, the clamp tightened the neck holder and the beam rotation was done, resulting in the simple job and obtaining the precise position.

However, since the relative adjustment of the neck holder part against the cone part depends on the frictional contact, there can be problems such that the structure of the deflection yoke can be complicated and the elements used are increased due to the additional final fixing tools such as bolts, nuts, and locking rings.

SUMMARY OF THE INVENTION

The present invention is to provide a deflection yoke comprising a cone part and a neck holder part. The neck holder part can be separated from the cone part. The cone part can relatively rotate against the neck holder part, which is attached on the outer circumferential surface of the neck of a CRT. This fact results in decreasing elements and simplifying manufacturing process, and also in obtaining the simple structure.

A deflection yoke according to the present invention is assembled in such a manner that a plug formed on one side of a neck holder part is inserted in the opposite opening of a cone part. A plurality of ratchets are equally arranged on the outer circumferential surface of the plug of the neck holder part. A plurality of ratchets are engaged with teeth formed on the inner circumferential surface of the opposite opening of the cone part, resulting in controlling the relative rotation of the cone part against the neck holder part. The ratchet is supported by elastic bridge in order to smoothly move over the teeth. A vertical and horizontal deflection coil are perpendicularly disposed and attached by hot melt on the inner and outer circumferential surface.

BRIEF DESCRIPTION OF THE DRAWINGS

Further features and advantages of the present invention will be apparent in the following preferred embodiment with reference to the accompanying drawings, in which.

DESCRIPTION OF THE PREFERRED EMBODIMENT

Figure 1:
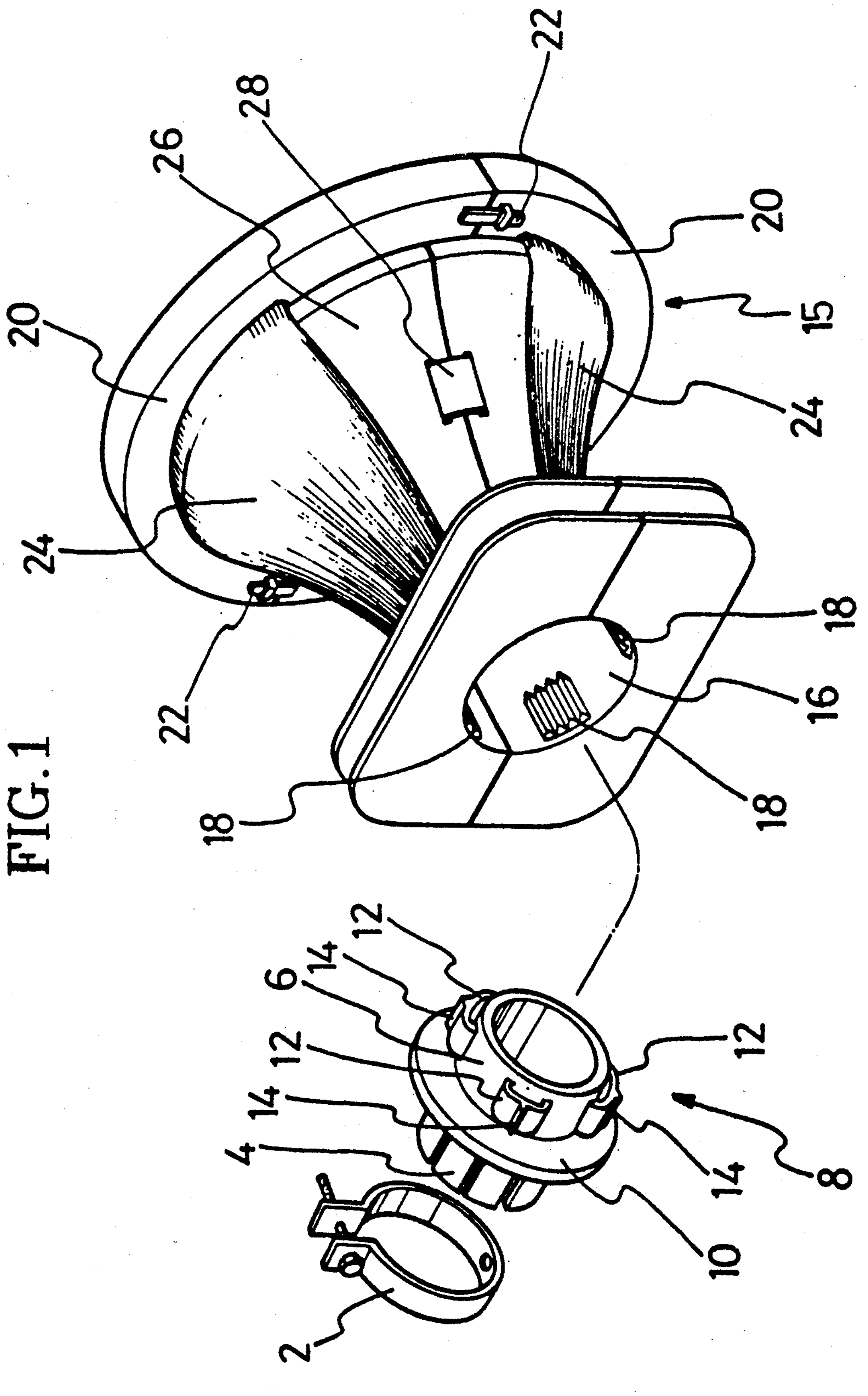
FIG. 1 is an exploded perspective view of a deflection yoke according to the present invention.

As shown in FIG. 1, segmental pieces 4 are formed on one side of a neck holder part 8 and tubular plug 6 is extended in its opposite direction. Annular clamp band 2 can be clamped around the segmental pieces 4. Flange 10 is projected as a boundary between the segmental pieces 4 and the tubular plug 6. Elastic bridges 12 are equally arranged on the outer circumferential surface of the tubular plug 6. Ratchet 14 is formed in the middle of elastic bridge 12. Teeth 18 are formed on the inner circumferential surface of the openings 16 of the cone part 15 and mesh with the ratchet 14, when the tubular plug 6 is connected to the opposite opening of the cone part 15. These teeth 18 are equally arranged the same as the ratchets 14.

Figure 2:
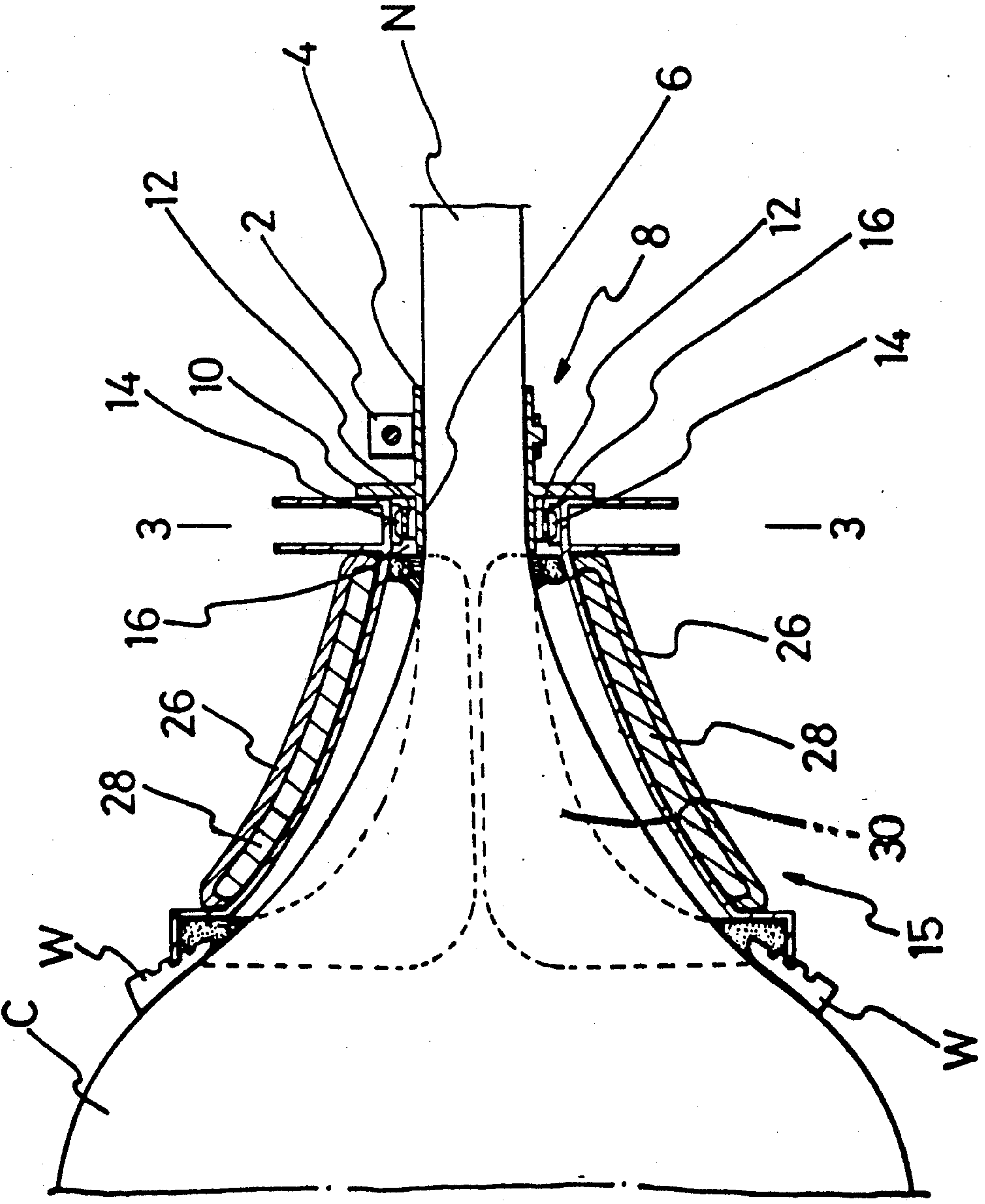
FIG. 2 is a sectional view of one embodiment of a deflection yoke of FIG. 1.

Meanwhile, a pair of separators 20 are symmetrically joined to form a cone part 15 such as the conventional art. FIG. 1 shows that separators 20 are connected by snap acting connectings 22. Cores 26 on which a vertical deflection coil 24 is wound are attached by clamps 28 on both sides of the outer circumferential surface of the cone part 15. On its inner circumferential surface, a horizontal deflection coil 30 is arranged perpendicularly to this vertical deflection coil 24 as FIG. 2 shows by a dotted line. The attachment of a horizontal and vertical deflection coil on the cone part depends on hot melt such as the conventional art.

FIG. 2 illustrates one embodiment of mounting a deflection yoke according to the present invention on a color cathode ray tube. The plug 6 of the neck holder part 8 is adapted for insertion in the opening 16 of the cone part 15 to meet the inner circumferential surface of the opening 16. The cone part 15 and the neck holder part 8 are subsequently inserted to the neck N of the color cathode ray tube C. At the position where the yoke pull-back is settled, the engagement bolt on annular clamp band 2 grips the neck holder part 8 tightly on the outer circumferential surface of the neck N. Next, the cone part 14 can be relatively rotated against the neck holder part 8 to control the beam rotation. When the cone part 15 is rotated against the neck holder part 8, the ratchet meshing the teeth 14 moves each one pitch over the teeth 18.

Figure 3:
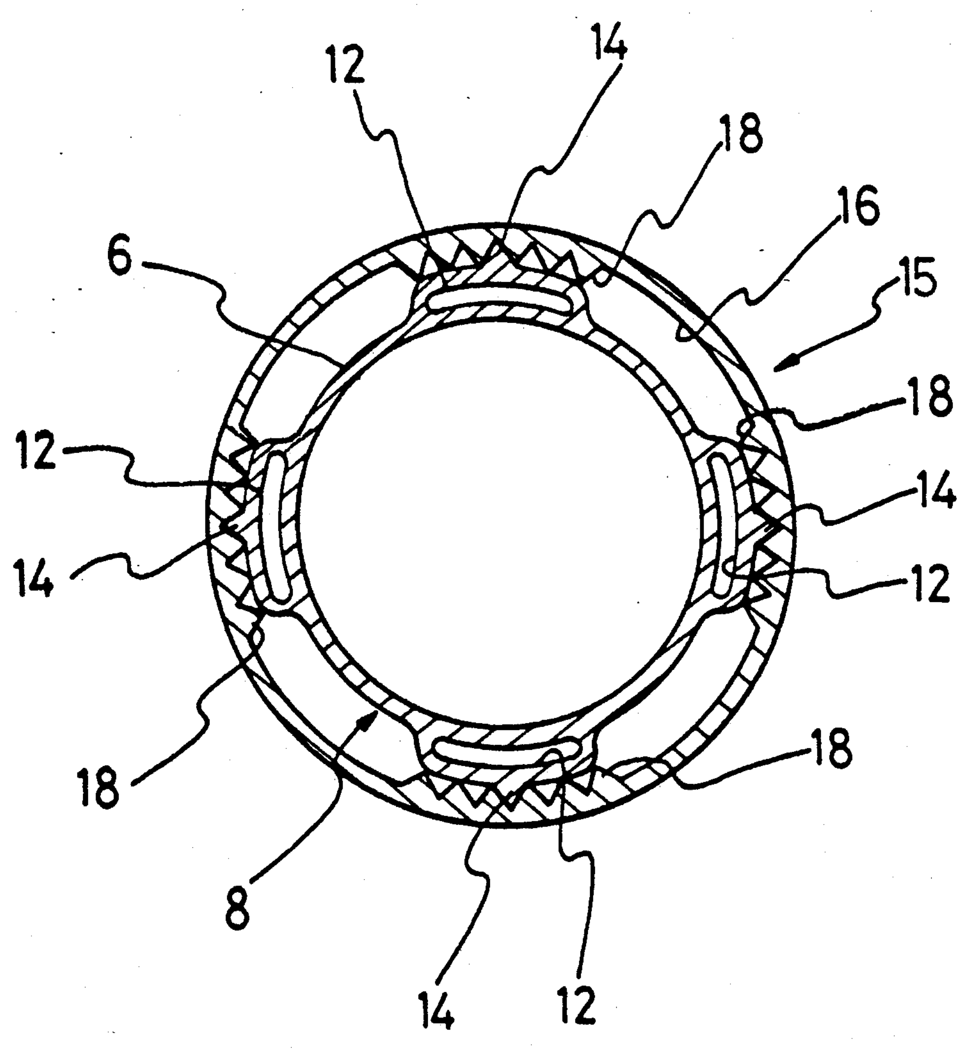
FIG. 3 is a sectional view taken along line 3—3 of FIG. 2.
Figure 4:
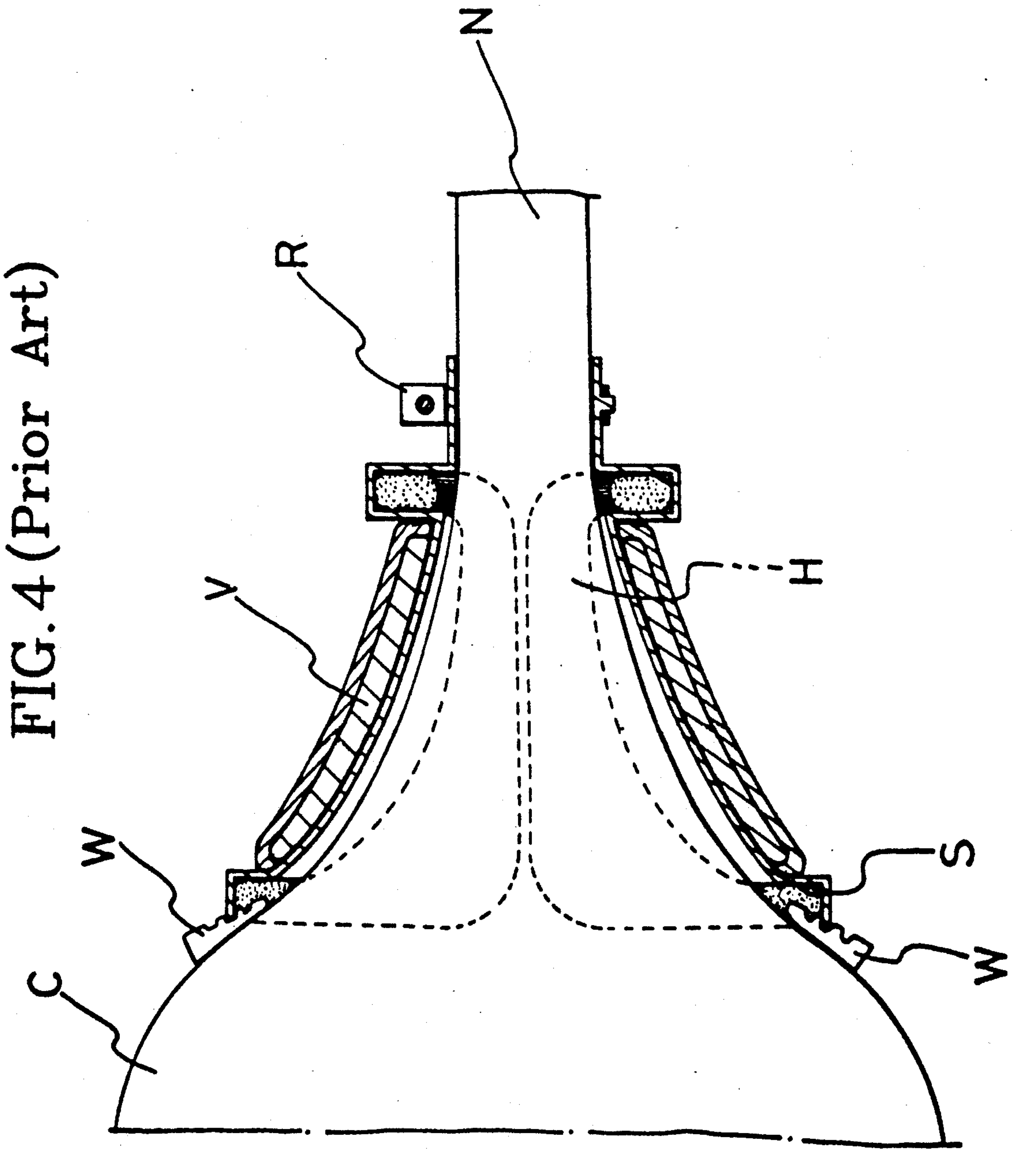
FIG. 4 (Prior Art)
FIG. 4 is a sectional view of one embodiment of a conventional prior art deflection yoke.

FIG. 3 shows that the ratchets 14 mesh with the teeth 18. The elastic bridge 12 supporting the ratchet 14 can dissolve elastically the external stress when the ratchets move over the teeth, thereby rotating smoothly the cone part 15. The pitch of teeth should be determined in accordance with 1 mm of minimum circular movable interval of the beam rotation.

To give an example of a 14-inch color cathode ray tube, one half of the length of the effective picture area is 140.4 mm, and the scanning inclination produces a height difference of 0.5 mm. Therefore, the ratio between the up and down movement range 1.0 mm and one half of the length of the effective area is to be obtained. Then, this ratio and a ratio between the pitch x of the teeth and one half of the neck portion (14.5 mm) of the 14-inch cathode ray tube are set to the same value, calculating the pitch of the teeth. This description will be expressed in a mathematical form as follows:

$$140.4:1.0=14.5:x$$

$$140.4x=14.5$$

$$x=0.103$$

Accordingly, the beam rotation is adjusted step by step by rotating the cone part 15. After that, the inclination of the cone part is adjusted against the funnel by wedges W and then attached by adhesive (silicon bond). As described above, the neck holder part and the cone part are connected with each other by means of ratchets and teeth, but the cone part can be rotated, whereby the problems of increasing elements and complicating the structure do not occur and also, it is possible to precisely install the deflection yoke.

What is claimed is:

1. A deflection yoke having a cone part and a neck holder part, wherein said neck holder part comprises:

segmental pieces formed on one side of said neck holder part, said neck holder having another side defined by a flange;

a tubular plug extending from the other side of said neck holder part;

a plurality of ratchets equally arranged on the outer circumferential surface of said plug, and wherein said cone part comprises:

a pair of separators symmetrically joined to each other and having a vertical and horizontal deflection coil on the inner and outer circumferential surface; and teeth equally arranged on the inner circumferential surface of an opening defined in said cone part for connecting with said plug of said neck holder part and meshing with said plurality of ratchets.

2. Said deflection yoke as claimed in claim 1, wherein said plurality of ratchets are projected on elastic bridges.

3. A deflection yoke comprising:

a neck holder having at one side thereof a tubular plug, the tubular plug having a plurality of ratchets disposed around the tubular plug, and on another side thereof having means for attachment to a neck of a cathode ray tube; and a cone part having deflection coils and means for separating the coils, and means for defining an opening in an end of said cone part and having teeth on an inner circumference thereof for meshing with the ratchets of the neck holder.

4. The deflection yoke of claim 3, wherein a pitch (x) of the teeth is calculated based on one-half of a length of effective picture area (A) for the cathode ray tube, an up and down movement range (R) of beam rotation, and one-half of a diameter (D) of the neck portion.

5. The deflection yoke of claim 3, wherein $x=R\cdot D/A$.

* * * * *